(12) United States Patent
Wierer et al.

(10) Patent No.: US 11,027,389 B2
(45) Date of Patent: Jun. 8, 2021

(54) HANDHELD POWER TOOL

(71) Applicant: Hilti Aktiengesellschaft, Schaan (LI)

(72) Inventors: Michael Wierer, Bludenz (AT); Roland Schaer, Grabs (CH); Philipp Lorenz, Munich (DE)

(73) Assignee: Hilti Aktiengesellschaft, Schaan (LI)

( * ) Notice: Subject to any disclaimer, the term of this patent is extended or adjusted under 35 U.S.C. 154(b) by 262 days.

(21) Appl. No.: 16/314,438

(22) PCT Filed: Jun. 22, 2017

(86) PCT No.: PCT/EP2017/065332
§ 371 (c)(1),
(2) Date: Dec. 30, 2018

(87) PCT Pub. No.: WO2018/007152
PCT Pub. Date: Jan. 11, 2018

(65) Prior Publication Data
US 2020/0122281 A1    Apr. 23, 2020

(30) Foreign Application Priority Data

Jul. 6, 2016  (EP) ..................... 16178070

(51) Int. Cl.
*B23Q 11/00* (2006.01)
*F16D 59/02* (2006.01)
*F16D 121/22* (2012.01)

(52) U.S. Cl.
CPC .......... *B23Q 11/0092* (2013.01); *F16D 59/02* (2013.01); *F16D 2121/22* (2013.01)

(58) Field of Classification Search
CPC ........ B23Q 11/0092; B23Q 7/00; B23Q 7/02; B23Q 15/00; B23Q 15/097; B62B 15/00;
(Continued)

(56) References Cited

U.S. PATENT DOCUMENTS

| | | | |
|---|---|---|---|
| 4,267,914 A * | 5/1981 | Saar | ..................... B23Q 11/04 192/147 |
| 4,871,033 A | 10/1989 | Odoni et al. | |

(Continued)

FOREIGN PATENT DOCUMENTS

| | | |
|---|---|---|
| EP | 0326783 B1 | 8/1989 |
| EP | 0486843 B1 | 5/1992 |

(Continued)

OTHER PUBLICATIONS

International Search Report of PCT/EP2017/065332, dated Aug. 23, 2017.

*Primary Examiner* — Bickey Dhakal
(74) *Attorney, Agent, or Firm* — Davidson, Davidson & Kappel, LLC

(57) ABSTRACT

A handheld power tool includes a tool holder for holding a tool, an electric motor, a shaft connecting the tool holder and the electric motor, and a protective device for stopping the tool holder in an uncontrolled situation. The protective device includes a sensor for detecting the uncontrolled situation, a switchable current source and a normally closing magnetic brake. The switchable current source outputs a first current not equal to zero in response to signals of the sensor if an uncontrolled situation is not detected; the current source does not output a current or outputs a second current different from the first current if an uncontrolled situation is detected. The normally closing magnetic brake engages on the shaft and does not apply a torque to the shaft when energized by the first current. The normally closing magnetic brake applies a torque counteracting the rotational movement of the shaft when not energized or when energized by the second current.

12 Claims, 2 Drawing Sheets

(58) Field of Classification Search
CPC .............. F16D 59/02; F16D 2121/22; B25D 2250/221; B25D 11/00; B25D 16/00; B25D 2250/201; B25D 2211/003; H02P 3/00; H02P 3/04; B25F 5/00
See application file for complete search history.

(56) References Cited

U.S. PATENT DOCUMENTS

| | | | |
|---|---|---|---|
| 5,879,111 | A | 3/1999 | Stock et al. |
| 5,954,457 | A * | 9/1999 | Stock .................. B25D 16/003 408/6 |
| 6,479,958 | B1 * | 11/2002 | Thompson ................ B25F 5/00 318/430 |
| 6,644,450 | B2 | 11/2003 | Kristen et al. |
| 2006/0081386 | A1 * | 4/2006 | Zhang ...................... B25F 5/00 173/2 |
| 2008/0202786 | A1 * | 8/2008 | Carrier ..................... B25F 5/00 173/176 |
| 2010/0078187 | A1 | 4/2010 | Chen et al. |
| 2013/0219725 | A1 * | 8/2013 | Winkel .................. B26B 15/00 30/228 |
| 2016/0089757 | A1 * | 3/2016 | Wirnitzer ........... B23Q 11/0092 173/2 |
| 2017/0361449 | A1 * | 12/2017 | Goble .................. B25B 23/147 |

FOREIGN PATENT DOCUMENTS

| | | |
|---|---|---|
| EP | 0841126 B1 | 5/1998 |
| EP | 0841127 B1 | 5/1998 |
| EP | 1219392 B1 | 7/2002 |

* cited by examiner

HANDHELD POWER TOOL

The present invention relates to a handheld power tool and a control method for a handheld power tool, in particular for handheld power tools which include rotating, rod-shaped tools, such as hammer drills, electric screwdrivers, etc.

BACKGROUND

A drill or a screwdriver bit may suddenly jam during operation. The torque applied by the electric motor is then abruptly transmitted to the hand of the user. The danger arises that the user is no longer able to control the handheld power tool and becomes injured.

EP 0486843 B1, EP 0841126 B1, EP 0326783 B1 and EP0841127 B1 propose different mechanical brakes for braking a shaft in an uncontrolled situation. EP1219392 B1 proposes a separation of the drive train in the uncontrolled situation. However, the proposed approaches are difficult and sluggish, in particular when resetting to controllable normal operation.

SUMMARY OF THE INVENTION

The present invention provides a handheld power tool that includes a tool holder for holding a tool, an electric motor, a shaft, which connects the tool holder and the electric motor, and a protective device for stopping the tool holder in an uncontrolled situation. The protective device includes a sensor for detecting the uncontrolled situation, a switchable current source and a normally closing magnetic brake. The switchable current source outputs a first current, which is not equal to zero, in response to signals of the sensor if an uncontrolled situation is not detected; the current source does not output a current or outputs a second current, which is different from the first current, if an uncontrolled situation is detected. The normally closing magnetic brake engages on the shaft. The normally closing magnetic brake does not apply a torque to the shaft when energized by the first current. The normally closing magnetic brake applies a braking torque counteracting the rotational movement of the shaft when not energized or when energized by the second current.

The normally closing magnetic brake is opened by the first freewheeling current. The freewheeling current flows through the magnetic brake during normal operation of the handheld power tool. As soon as the freewheeling current is absent, the magnetic brake automatically closes. The closing action takes place independently of any control electronics, for example even if the power supply fails. The freewheeling current is preferably a constant direct current.

One embodiment provides that the magnetic brake includes a stationary brake shoe and a brake disk, rotatable around the axis of the shaft relative to the brake shoe, for example rotatably fixed to the shaft and movable along the shaft. The brake shoe tribologically brakes the brake disk, which is connected to the shaft.

One embodiment provides that the magnetic brake includes a permanent magnet and a solenoid coil. The permanent magnet generates a permanent magnetic field, and the solenoid coil generates, with the aid of the first current, an (obliterating) magnetic field which is antiparallel to the permanent magnetic field. The permanent magnetic field induces the braking torque. The obliterating magnetic field counteracts the permanent magnetic field. If the freewheeling current is flowing, the two magnetic fields largely obliterate each other. The permanent magnet may have a one-part or multi-part design.

The brake shoe and the permanent magnet may be situated in the closing direction of the brake disk. The permanent magnet pulls the brake disk to the brake shoe to close the magnetic brake.

One embodiment provides that a pole shoe surrounds the permanent magnet and the solenoid coil for guiding the magnetic fields. The two magnetic fields are combined in spatial proximity to the brake disk, whereby a good obliteration of the magnetic fields is achievable. The pole shoe may include two annular projections, situated one inside the other, which face the brake disk.

The brake disk is preferably formed from a soft magnetic material. The brake disk thus rapidly responds to a change in the magnetic field strength during the opening or closing of the magnetic brake.

One embodiment provides for a spring placed against the brake disk. The spring exerts a force, oriented away from the brake shoe, to the brake disk. The spring may facilitate a detachment of the brake disk from the brake shoe, in particular against the force of gravity.

A control method for a handheld power tool provides the following steps: Energizing the magnetic brake by a freewheeling current; activating the electric motor to drive the shaft in response to an actuation of the operating switch and after the magnetic brake is energized; and interrupting the energizing of the magnetic brake by the first current and decoupling the electric motor from the power supply in response to a detection of a signal of the sensor indicating an uncontrolled situation. The freewheeling current is preferably constant and predefined solely by the magnetic brake, in particular independently of a rotational speed to be set or a power consumption of the handheld power tool. The power consumption of the handheld power tool varies as a function of the instantaneously present load.

BRIEF DESCRIPTION OF THE FIGURES

The following description explains the present invention based on exemplary specific embodiments and figures. In the figures.

Unless otherwise indicated, identical or functionally equivalent elements are identified by identical reference numerals in the figures.

DETAILED DESCRIPTION OF THE INVENTION

Figure 1:
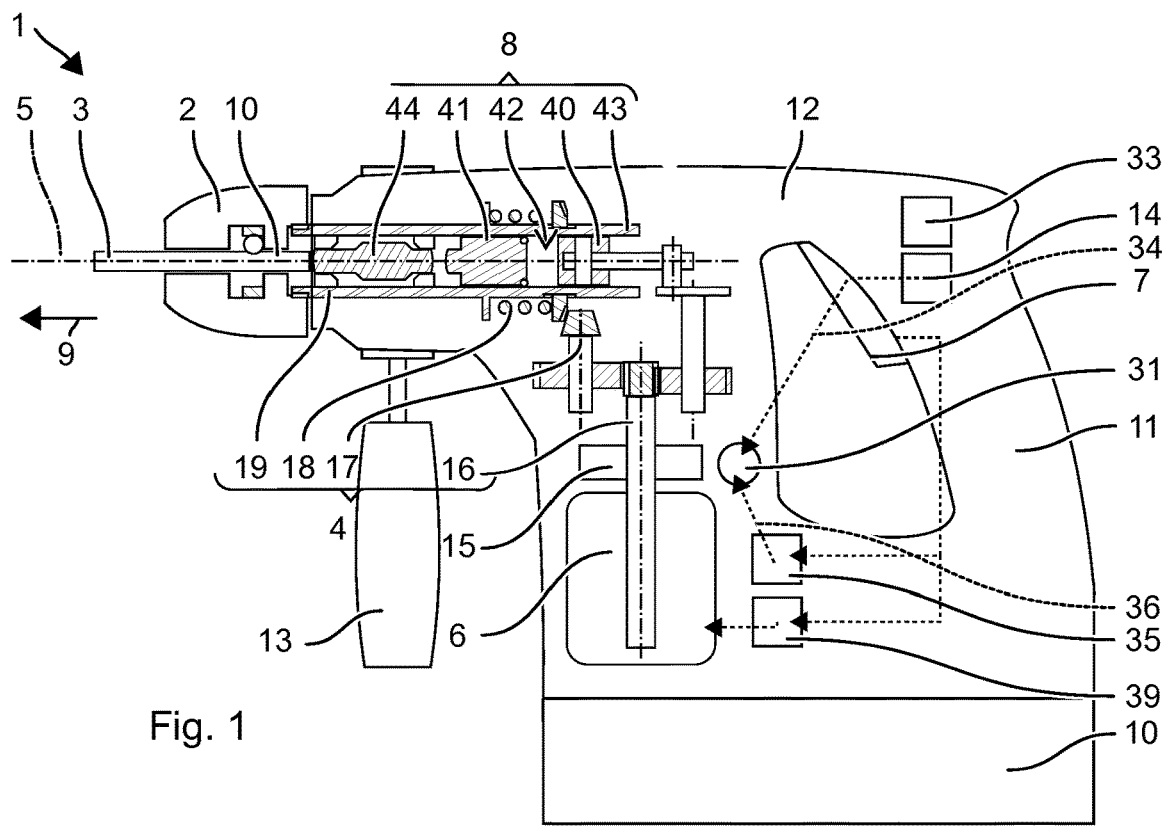
FIG. 1 shows a hammer drill.

FIG. 1 schematically shows a hammer drill 1 as an example of a handheld power tool. Hammer drill 1 includes a tool holder 2, into which a drill 3 or another tool may be inserted and locked. The example of hammer drill 1 includes a rotary drive 4, which rotatably drives tool holder 2 around its working axis 5. Rotary drive 4 is based on an electric motor 6, which the user is able to switch on and off via an operating switch 7. An additional striking mechanism 8 may periodically strike drill 3 in an impact direction 9 along working axis 5. Striking mechanism 8 is preferably driven by the same electric motor 6. Power may be supplied via a battery 10 or a power cord.

Hammer drill 1 includes a handle 11, which is typically fastened on an end of a power tool housing 12 of hammer drill 1 facing away from tool holder 2. An additional handle 13 may be fastened, for example near tool holder 2. The user may guide and hold hammer drill 1 by the handle during drilling. The rotational speed may be adjusted to a setpoint value. During drilling, a low retroactive torque typically acts upon the user, which results from the resistance of stone to rotating drill 3. The user may exert the necessary holding force effortlessly or with little effort.

Drill 3 may jam in the drill hole, whereby a high torque is exerted on tool holder 2 as a result of rotary drive 4, which continues to rotate. The retroactive torque may increase abruptly and harm the user and hammer drill 1. To prevent injury to the user and damage to hammer drill 1, a protective device 14 automatically stops the normal operation of hammer drill 1. Protective device 14 brakes rotary drive 4 in the event of a malfunction with the aid of a magnetic brake 15.

Rotary drive 4 is rigidly coupled with tool holder 2. The example of rotary drive 4 includes a (motor) shaft 16, a stepped-down gearing 17 and a friction clutch 18 and output shaft 19. The example of output shaft 19 has a hollow design.

Magnetic brake 15 is situated on shaft 16. Shaft 16 is preferably situated between electric motor 6 and gearing 17. Shaft 16 rotates at the same rotational speed as electric motor 6.

Figure 2:
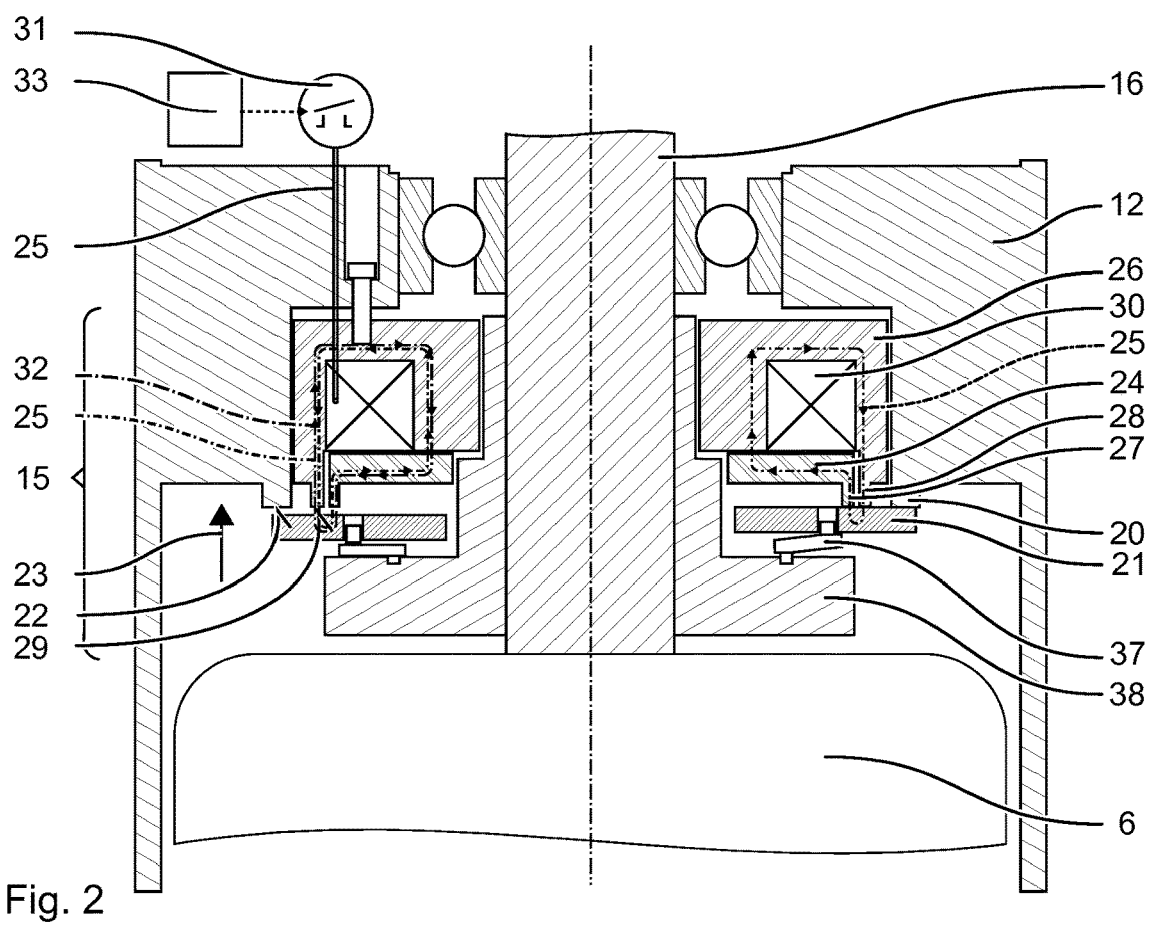
FIG. 2 shows a magnetic brake.

Magnetic brake 15 includes a brake shoe 20 and a brake disk 21. Brake shoe 20 is situated in a stationary manner in power tool housing 12. Brake shoe 20 has an annular friction surface 22, which is situated facing brake disk 21. Brake disk 21 is rotatably rigidly connected to shaft 16. Brake disk 21 is supported in an axially movable manner. Brake disk 21 may be displaced between a freewheeling position (FIG. 2, left half of the diagram) and a braking position (FIG. 2, right half of the diagram) and vice versa. The direction of the freewheeling position with respect to the braking position is referred to below as closing direction 23. Brake disk 21 is situated at a distance from brake shoe 20 in the freewheeling position. Brake shoe 20 does not exert a torque on brake disk 21. Shaft 16 may rotate freely. Brake disk 21 abuts a friction surface 22 of brake shoe 20 in the braking position. The friction coefficient between brake shoe 20 and brake disk 21 is preferably very high. Brake shoe 20 exerts a torque on brake disk 21 against a rotational movement. Brake disk 21 and shaft 16 connected thereto are braked.

Brake disk 21 is made from a soft magnetic and preferably ferromagnetic material. Brake disk 21 is pressed against brake shoe 20 in closing direction 23 by a reluctance force.

Magnetic brake 15 includes a permanent magnet 24, which generates a permanent magnetic field 25. Permanent magnet 24 is situated in closing direction 23 of brake disk 21, i.e. on the same side of brake disk 21 as brake shoe 20. Permanent magnetic field 25 flows through brake disk 21. An air gap is situated between brake disk 21 and permanent magnet 24, which is larger in the freewheeling position than in the braking position. According to the reluctance principle, permanent magnet 24 pulls brake disk 21 into the braking position in closing direction 23.

Permanent magnet 24 may be provided with a pole shoe 26, which facilitates a guidance of permanent magnetic field 25 toward brake disk 21. The example of pole shoe 26 includes two annular projections 27, 28, which are situated one inside the other, e.g. concentrically, and are separated by an annular air gap. The two projections 27, 28 project against closing direction 23, i.e. in the direction of brake disk 21. Permanent magnetic field 25 exits at the one projection 27 and enters at other projection 28. In the braking position, brake disk 21 abuts both projections 27, 28 or is situated at a very short distance from the annular surfaces 29 thereof; the distance is preferably less than 0.5 mm. Brake disk 21 closes the magnetic flux or reduces the air gap. The air gap is much larger, e.g. ten times larger, in the freewheeling position. The guidance of permanent magnetic field 25 may also take place via a projection 27 and brake shoe 20, which also form two rings, situated one inside the other and separated by an air gap.

The reluctance force exerted by permanent magnet 24 on brake disk 21 and active in closing direction 23 is preferably sufficient to induce a torque sufficient to stop shaft 16 in combination with the friction coefficient. Magnetic brake 15 is closed in its deenergized state.

Magnetic brake 15 includes a solenoid coil 30. Solenoid coil 30 is preferably situated together with permanent magnet 24 on the same side of brake disk 21 as brake shoe 20. Solenoid coil 30 is connected to a current source 31. Current source 31 may supply a first current I1 (freewheeling current I1) to solenoid coil 30. Solenoid coil 30, through which freewheeling current I1 flows, generates a(n) (obliterating) magnetic field 32, which completely or almost obliterates permanent magnetic field 32 at least in the surroundings of brake disk 21. Permanent magnetic field 32 and obliterating magnetic field 32 have the same magnetic flux density, but in opposite flow directions, near brake disk 21, for example at annular projections 27, 28. The flux densities differ from each other, for example, by less than 10%. The reluctance force is canceled out. Magnetic brake 15 is opened and releases shaft 16. To hold magnetic brake 15 open, the latter must be energized by continuous and constant freewheeling current I1. The energy loss is, for example, in the range from 2 watts to 20 watts.

Current I of current source 31 is switchable. Current source 31 may output freewheeling current I1 in one switching position and output a second current I2 in another switching position. Switching between the two current levels may take place continuously or discretely. Second current I2 is preferably much lower than freewheeling current I1, for example less than 20% of the freewheeling current. Second current I2 should particularly preferably be set to zero. Only permanent magnet 24 is essentially operative. Permanent magnet 24 closes magnetic brake 15. Magnetic brake 15 deploys its braking torque without consuming energy. If an elevated braking torque is needed, second current I2 may have a reverse polarity to freewheeling current I1, since in this case solenoid coil 30 increases the reluctance force. When switching from the closed position of magnetic brake 15 to the open position, a higher current than freewheeling current I2 may be temporarily supplied. When opening the air gap, a higher force is typically needed to overcome the magnetic forces than when subsequently maintaining the open position.

Switchable magnetic field 32 is preferably guided by same pole shoe 26. Pole shoe 26 may be situated around solenoid coil 30. Permanent magnet 24 may form a section of pole shoe 26. Brake shoe 20 may also be used to guide magnetic field 25.

The example of protective device 14 includes a motion sensor 33. Motion sensor 33 is situated, for example, on or near handle 13. Motion sensor 33 detects a rotational movement of handle 13 around working axis 5. An example of motion sensor 33 is a gyro sensor, which directly ascertains a Coriolis force applied by the rotational movement, based on an angular velocity. The gyro sensor may include, for example, a small vibrating plate whose vibration frequency is varied by the Coriolis force. An alternative motion sensor 33 detects an acceleration at two offset points in hammer drill 1 and ascertains the rotational movement of hammer drill 1 from the difference.

Protective device 14 evaluates the rotational movement as to whether an uncontrolled rotational movement of hammer drill 1 around working axis 5 is present or whether a pivoting of hammer drill 1 around working axis 5 by the user is present. Protective device 14 outputs a braking signal 34 to magnetic brake 15 and current source 31 if an uncontrolled rotational movement is detected.

Protective device 14 may evaluate, for example the angular velocity around working axis 5 for the purpose of detecting the uncontrolled rotational movement. One example of a criterion is when the angular velocity exceeds a threshold value which is not exceeded in typical applications. Another criterion is when a predefined rotation angle is exceeded within a predefined period of time, e.g. because hammer drill 1 continuously rotates against the holding force of the user. The criteria may contain different pairings of angular velocity and rotation angle with suitable threshold values and observation time periods.

Protective device 14 may include a current sensor. The current sensor monitors the power consumption of electric motor 6. If the power consumption, in particular the current, exceeds a threshold value, this indicates a malfunction or uncontrolled situation. Protective device 14 may output braking signal 34 in this case. Other sensors for detecting an uncontrolled situation may be used.

Figure 3:
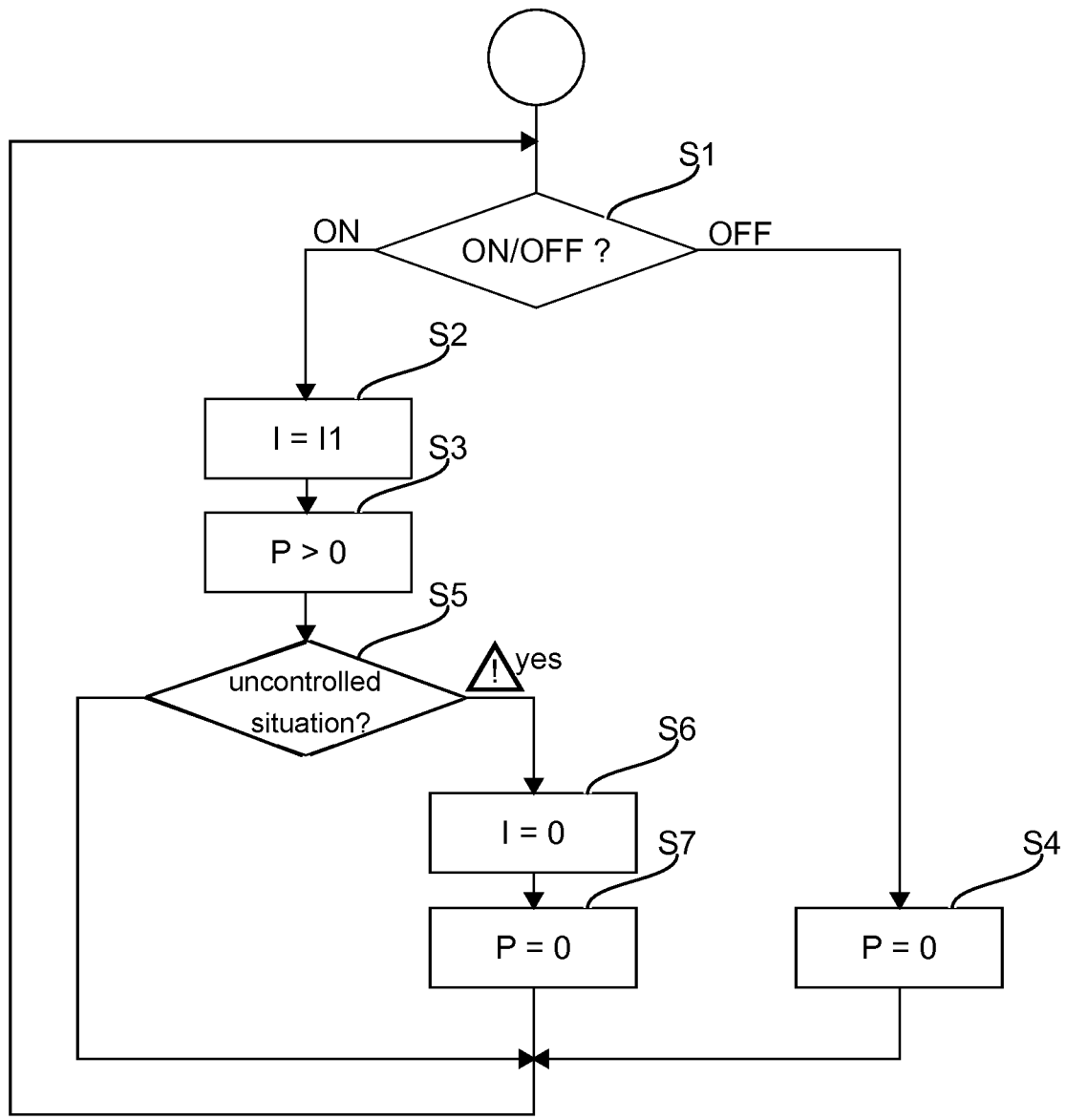
FIG. 3 shows a control method.

An example of a control method for handheld power tool 1 is set up schematically in FIG. 3. In response to an actuation of operating switch 7 (Step S1), magnetic brake 15 is first released (Step S2), e.g. in that a control unit 35 is activated. A control unit 35 outputs an enable signal 36 to magnetic brake 15 and current source 31. Current source 31 subsequently supplies freewheeling current I1 to solenoid coil 30. Magnetic brake 15 opens. Electric motor 6 is then supplied with power P to drive shaft 16 and tool holder 2 and possibly striking mechanism 8 (Step S3). The opening of magnetic brake 15 and supply of electric motor 6 take place consecutively. Handheld power tool 1 is in operation as long as operating switch 7 is being pressed. Once the user releases operating switch 7, electric motor 6 is disconnected from power supply 10, and handheld power tool 1 stops operating (Step S4).

During operation, protective device 14 checks whether motion sensor 33 or another sensor signals an uncontrolled situation (Step S5). If no uncontrolled situation is present, electric motor 6 remains in operation and magnetic brake 15 remains open. If protective device 14 detects an uncontrolled situation, protective device 14 outputs braking signal 34 to magnetic brake 15. Current source 31 switches off freewheeling current I1. For example, current source 31 is disconnected from solenoid coil 30, so that current I drops to zero (Step S6). Tool holder 2 is brought to a standstill. The user may release magnetic brake 15 again by releasing operating switch 7 and actuating it again.

Electric motor 6 may be disconnected from power supply 10 simultaneously with the brake application (Step S7). Alternatively or additionally, electric motor 6 may apply a braking torque. For example, the windings of electric motor 6 may be short-circuited via a load resistor. The electric current generated by electric motor 6, which is acting as a generator, is converted to heat in the load resistor. Alternatively or additionally, a mechanical overload clutch may be situated between electric motor 6 and magnetic brake 15, which disconnects electric motor 6 from shaft 16 upon actuation of the magnetic brake 15. A disconnection of electric motor 6 may be delayed or take place only when operating switch 7 is released by the user.

Magnetic brake 15 may already be opened before the user actuates operating switch 7. For example, motion sensor 33 detects, based on shocks, that the user is holding and guiding handheld power tool 1 in his hand. Magnetic brake 15 is opened in response to the detection of the guidance of handheld power tool 1 by the user. Magnetic brake 15 may be closed if handheld power tool 1 was inactive for a predetermined period of time.

Brake disk 21 may be pretensioned against closing direction 23 with the aid of a spring 37. The spring force is much less than the reluctance force applied by permanent magnet 24, e.g. less than 10%. The spring force approximately corresponds to the weight force of brake disk 21 to possibly move brake disk 21 into the opened switching position against the force of gravity. This may be necessary, since permanent magnet 24 and solenoid coil 30 are unable to generate a force against closing direction 23, limited to the reluctance principle.

Spring 37 may be implemented, for example by leaf springs, which run essentially in parallel to brake disk 21. One end of each leaf spring is connected to brake disk 21 and another end of the leaf spring is connected to a carrier plate 38. Carrier plate 38 is rigidly fastened to shaft 16 via a press fit or in another manner. On the one hand, springs 37 permit the axial movement of brake disk 21, and, on the other hand, springs 37 transmit the torque acting between shaft 16 and brake shoe 20 in an undamped manner. Many other constructions are possible to achieve an axial mobility and simultaneously a rigid rotary connection for transmitting a torque. For example, brake disk 21 may be guided in axial grooves of shaft 16.

The user may switch rotary drive 4 on and off with the aid of operating switch 7. The example of operating switch 7 has a deactivating switching position and one or multiple activating switching positions. The user may select one of the activating switching positions, for example by selecting the actuating force. The different switching positions may be associated with different rotational speeds of rotary drive 4, which result in different power consumptions P of electric motor 6. A motor controller 39 may vary the power consumption and the corresponding current flow in electric motor 6 in such a way that a constant rotational speed N sets in. Power consumption P may vary due to different loads at a constant rotational speed N. The current flow in electric motor 6 therefore varies during operation. The limitation of the power consumption or the rotational speed may be predefined, for example, by the user and the intensity of actuating operating switch 7.

Electric motor 6 may be a universal motor, a mechanically commutating electric motor 6 or an electrically commutating electric motor 6. Motor controller 39 decouples electric motor 6 from the power supply when operating switch 7 is in the deactivating position.

Striking mechanism 8 is, for example, a pneumatic striking mechanism. An exciter piston 40 is forced by electric motor 6 into a periodic back and forth movement along working axis 5. A striker 41 running on working axis 5 is coupled to exciter piston 40 via an air spring. The air spring is formed by a pneumatic chamber 42, which is closed by exciter piston 40 and striker 41. Exciter piston 40 and striker 41 may be guided in a guiding tube 43, which simultaneously closes pneumatic chamber 42 in the radial direction. An anvil 44 may be situated in impact direction 9 of striker 41. Striker 41 strikes anvil 44, which transfers the impact into drill 3 situated in tool holder 2.

The invention claimed is:

1. A handheld power tool comprising:
a tool holder for holding a tool;
an electric motor;
a shaft connecting the tool holder and the electric motor; and
a protective device for stopping the tool holder in an uncontrolled situation, the protective device including:
a sensor for detecting the uncontrolled situation;
a switchable current source outputting a first current not equal to zero in response to signals of the sensor if an uncontrolled situation is not detected and not outputting a current or outputting a second current different from the first current if an uncontrolled situation is detected; and
a normally closing magnetic brake for engaging on the shaft and not applying a torque to the shaft when energized by the first current and applying a torque counteracting the rotational movement of the shaft when not energized or when energized by the second current; wherein the magnetic brake includes a stationary brake shoe and a brake disk movable relative to the brake shoe around the axis of the shaft and along the shaft and wherein the magnetic brake further includes a permanent magnet and a solenoid coil, a permanent magnetic field generated by the permanent magnet and a magnetic field generated by the solenoid coil, through which the first current flows, being antiparallel, and wherein the brake shoe and the permanent magnet are situated in a closing direction of the brake disk.

2. The handheld power tool as recited in claim 1 wherein a pole shoe surrounds the permanent magnet and the solenoid coil for the purpose of guiding the permanent magnetic field and the magnetic field generated by the solenoid coil.

3. The handheld power tool as recited in claim 2 wherein the pole shoe includes two annular projections, situated one inside the other and facing the brake disk.

4. The handheld power tool as recited in claim 1 wherein a flux density of the permanent magnetic field on an annular surface of the magnetic brake differs in terms of absolute value from the flux density of the magnetic field on the annual surface by less than 10%.

5. The handheld power tool as recited in claim 1 wherein the brake disk is formed from a soft magnetic material.

6. The handheld power tool as recited in claim 1 further comprising a spring placed against the brake disk exerting a force oriented away from the brake shoe on the brake disk.

7. The handheld power tool as recited in claim 1 wherein the second current is less than 20% of the first current, or the second current has a polarity opposite that of the first current.

8. The handheld power tool as recited in claim 1 wherein the sensor contains a rotational movement sensor detecting a rotational movement of a handle.

9. The handheld power tool as recited in claim 1 further comprising a striking mechanism driven by the electric motor.

10. A control method for a handheld power tool including an operating switch, an electric motor, a tool holder, a shaft connecting the electric motor to the tool holder, a normally closing magnetic brake situated on the shaft, and a sensor for detecting an uncontrolled situation, wherein the magnetic brake includes a stationary brake shoe and a brake disk movable relative to the brake shoe around the axis of the shaft and along the shaft and wherein the magnetic brake further includes a permanent magnet and a solenoid coil, a permanent magnetic field generated by the permanent magnet and a magnetic field generated by the solenoid coil, through which the first current flows, being antiparallel wherein the brake shoe and the permanent magnet are situated in a closing direction of the brake disk, the control method comprising the steps of:
energizing the magnetic brake by a first current;
activating the electric motor for driving the shaft in response to an actuation of the operating switch and after the magnetic brake is energized;
interrupting the energizing of the magnetic brake by the first current; and
decoupling the electric motor from the power supply in response to a detection of a signal of the sensor indicating the uncontrolled situation.

11. The control method as recited in claim 10 wherein a power consumption of the electric motor is adjusted in response to a predefined rotational speed.

12. The control method as recited in claim 10 wherein the first current is a constant direct current.

\* \* \* \* \*